United States Patent
Heintz et al.

[19]

[11] Patent Number: 6,056,405
[45] Date of Patent: May 2, 2000

[54] LAMP MODULE WITH KINEMATIC MOUNT

[75] Inventors: Brian G. Heintz, Canby, Oreg.; Edmund D. Passon, Best, Netherlands

[73] Assignee: In Focus Systems, Inc., Wilsonville, Oreg.

[21] Appl. No.: 09/173,498

[22] Filed: Oct. 15, 1998

[51] Int. Cl.[7] .................................................. G03B 21/20
[52] U.S. Cl. ............................................. 353/85; 353/98
[58] Field of Search ................................ 353/87, 85, 86, 353/98; 348/787, 789, 788; 362/430, 226

[56] References Cited

U.S. PATENT DOCUMENTS

| | | | |
|---|---|---|---|
| 3,761,170 | 9/1973 | Genesky et al. | 353/87 |
| 3,974,370 | 8/1976 | Pearson | 240/41 |
| 4,053,759 | 10/1977 | Wilkinson | 362/218 |
| 4,430,696 | 2/1984 | Lemcke | 362/306 |
| 4,470,105 | 9/1984 | Churchill | 362/396 |
| 4,770,497 | 9/1988 | Brown . | |
| 4,785,383 | 11/1988 | Tarnay | 362/226 |
| 5,215,371 | 6/1993 | Pileski | 362/306 |
| 5,235,498 | 8/1993 | Van Dulmen et al. | 362/296 |
| 5,347,324 | 9/1994 | Sasaki et al. | 348/789 |
| 5,651,603 | 7/1997 | Döring | 362/61 |
| 5,744,901 | 4/1998 | Friederichs et al. | 313/113 |

OTHER PUBLICATIONS

Kinematic Mounts, http://www.newport.com/tutorials/Kinematic_Mounts.html, Newport Corporation, visited Jun. 18, 1998.

Melles Griot 1995/96 Catalog, pp. 24–2 to 24–6.

*Primary Examiner*—William Dowling
*Attorney, Agent, or Firm*—Stoel Rives LLP

[57] ABSTRACT

A lamp module includes a lamp-reflector assembly supported within a plastic lamp frame for installation within an image projector to direct light toward a projection engine of the image projector. The lamp-reflector assembly includes a light source accurately positioned near the crown of an elliptical reflector and a plurality of precisely sized kinematic mounting features accurately spaced around the periphery of the reflector for mating with a plurality of complementary mounting points accurately located on the image projector about a light-path aperture of the projection engine. The kinematic mounting features preferably include a flat, a cone, and a V-groove; and the mounting points are preferably three convex hemispherical surfaces. Mating the kinematic mounting features to the mounting points imparts six independent constraints, three translational and three rotational, to eliminate the six degrees of positional freedom. Alternatively, the kinematic mounting features are spaced about the light-path aperture, and the hemispherical mounting points are formed directly onto the reflector about its periphery. A biasing mechanism biases the lamp-reflector assembly toward the light-path aperture to seat the kinematic mounting features against the mounting points and thereby precisely orient the lamp-reflector assembly relative to the light-path aperture.

15 Claims, 8 Drawing Sheets

LAMP MODULE WITH KINEMATIC MOUNT

TECHNICAL FIELD

The present invention relates to image projection devices and, in particular, to devices and methods for mounting a replaceable reflector-lamp module to such projection devices.

BACKGROUND OF THE INVENTION

Projection systems have been used for many years to project motion pictures and still photographs onto screens for viewing. More recently, multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion display images of a type rendered by the PC. A projection engine of these multimedia projection systems includes a light source, an image-forming device, and optical components for directing images onto a screen. The light source typically includes a replaceable lamp module for generating and directing light toward the image-forming device before it is projected on the screen. Lamp modules include a lamp-reflector assembly having a concave reflector and a lamp or burner accurately mounted near the focal point of the concave reflector. Because lamps have limited life expectancy, lamp modules are designed to be replaced in the field by a user of the projection system.

Significant effort has been invested into developing projectors producing bright, high-quality color images. However, the optical performance of conventional projectors is often less than satisfactory. For example, suitable projected image brightness is difficult to achieve, especially when using compact portable color projectors in a well-lighted room. The intensity of the light that can be generated by the lamp is one limitation of compact projectors. To maximize the intensity of light directed toward the image-forming device, an elliptical reflector is often used in the lamp-reflector assembly instead of a spherical or parabolic reflector. However, for optimal results, elliptical reflectors must be accurately positioned relative to a light-path aperture of the projection engine within true position and parallelism tolerances of approximately ±0.002 inch (0.05 mm), making it impractical to adjust the position of the lamp-reflector assembly after it is installed in the projector.

FIG. 1 shows an exploded view of a prior art lamp module 10 that includes a mounting bracket 12 having a pair of opposing channels 14 formed therein. Channels 14 are sized to slide onto mounting rails located within a projector (not shown) for precise positioning of mounting bracket 12 without the use of tools. A cover plate 16 is securely mounted to mounting bracket 12 and includes perforations that allow airflow generated by a fan within the projector (not shown) to pass through lamp module 10. A lamp-reflector assembly 18 is held securely in place against an adjustment plate 20 by a spring clip 22. Lamp-reflector assembly 18 includes a collar 24 having a flat face 26 that seats against pads 28 on the surface of adjustment plate 20 to fix the position of lamp-reflector assembly 18 along the X-axis. Collar 26 includes a groove (not shown) in which a key 30 on the surface of adjustment plate 20 fits to maintain the rotational position of lamp-reflector assembly 18. Because pads 28 and key 30 are formed in sheet metal, lamp-reflector assembly cannot be accurately positioned on adjustment plate within the desired tolerances.

Three screws 32 are inserted through three oversize holes 34 in adjustment plate 20 and threaded into three threaded holes 36 in mounting bracket 12. Oversize holes 34 allow the position of adjustment plate 20 (with lamp-reflector assembly 18 mounted thereon) to be adjusted by the manufacturer in the Y- and Z-directions during the assembly of lamp module 10. After adjusting the position of the adjusting plate 20, screws 32 are tightened to fix the position of adjustment plate 20 relative to mounting bracket 12. Typically the adjustment is performed while verifying the positional accuracy of lamp-reflector assembly 18 relative to mounting bracket 12. This verification is accomplished by sliding lamp module 10 onto a test fixture and measuring the position of lamp-reflector assembly 18 or the light generated by lamp-reflector assembly 18, relative to the test fixture.

Lamp module 10 is expensive to manufacture because mounting bracket 12, adjustment plate 20, spring clip 22, and screws 32 are all metal components. In particular, adjustment plate is difficult to manufacture due to the accurately sized pads 28 necessary to locate lamp-reflector assembly 18 in the X-direction. Heavy metal components are also undesirable because they cause the projector to be less portable, especially if a spare lamp module 10 is also carried. The individual adjustment of each lamp module 10 in the Y- and Z-directions during assembly also contributes significantly to the manufacturing cost of lamp module 10.

SUMMARY OF THE INVENTION

An object of the invention is, therefore, to provide an apparatus and a method for accurately positioning a lamp-reflector assembly in relation to a light-path aperture of an image projector.

Another object of this invention is to provide such an apparatus and a method for use in a multimedia projection system to provide improved display brightness and image quality.

A further object of the invention is to provide such an apparatus that reduces manufacturing costs by the use of plastic components and by eliminating the need to manually adjust the position of the lamp-reflector assembly during assembly of either the apparatus or the image projector.

Yet another object of this invention is to provide an apparatus that improves the portability of a multimedia projector in which the apparatus is used.

These and other objects of the invention are accomplished by a lamp module including a lamp-reflector assembly supported within a plastic lamp frame that is connected to a plastic lamp housing of an image projector. The lamp-reflector assembly includes a light source accurately positioned near the crown of a concave reflector that is preferably of an elliptical shape to maximize the amount of light directed toward a projection engine of the image projector. A plurality of precisely sized kinematic mounting features are accurately spaced around the periphery of the reflector for mating with a plurality of complementary mounting points accurately located on the image projector about a light-path aperture of the projection engine. The kinematic mounting features preferably include a flat, a cone, and a V-groove; and the mounting points are preferably three convex hemispherical surfaces.

Mating the kinematic mounting features to the mounting points imparts six independent constraints, three translational and three rotational, to eliminate the six degrees of positional freedom. The cone eliminates three translational degrees of freedom, the V-groove eliminates two rotational degrees of freedom, and the flat eliminates the third rotational degree of freedom. Kinematic mounting systems of this type are known to be used for optics laboratory purposes. Other kinematic mounting systems, in addition to the flat-cone-groove type, are contemplated to be within the scope of the present invention when they provide six independent constraints. To reduce manufacturing costs, the kinematic mounting features are formed in a ceramic collar that is bonded to the reflector at its periphery using ceramic cement. Alternatively, the kinematic mounting features are spaced about the light-path aperture, and the hemispherical mounting points are formed in the collar or directly onto the periphery of the reflector. A biasing mechanism biases the lamp-reflector assembly toward the light-path aperture to seat the kinematic mounting features against the mounting points and thereby precisely orient the lamp reflector assembly relative to the light-path aperture.

The light source of the lamp-reflector assembly is preferably a metal-halide arc lamp to project from the image projector an image having a luminous flux ranging from approximately 470 to approximately 550 lumens. The metal-halide arc lamp operates at temperatures in excess of 950° C. at its surface. To facilitate cooling of the lamp module and to reduce heat transfer from the light source to the projection engine, the concave reflector is formed of glass and coated with an infrared transmissive dichroic coating. The dichroic coating, also known as a cold mirror coating, allows heat energy radiating from the light source to pass through the reflector while reflecting visible wavelengths of light. The dichroic coating also transmits ultraviolet radiation to minimize the degradation of plastic optical components and other components of the projection engine that are sensitive to ultraviolet light. The ceramic material of the collar and the ceramic cement have a coefficient of thermal expansion that is similar to that of the glass reflector so that the collar will not separate from the reflector when in use. The lamp-reflector assembly also includes a ceramic endcap on which the reflector and light source are accurately positioned relative to each other and to which the reflector and light source are bonded with ceramic cement. An electric fan positioned within the image projector adjacent the lamp housing directs a cooling airflow through the lamp frame and across the outer surface of the lamp-reflector assembly. A slot in the collar holds a metal deflector fin for deflecting airflow into the concave region of the lamp-reflector assembly to cool the light source and the concave surface of the reflector.

The projection engine includes a condenser tube and a projection engine housing that are both formed of cast magnesium for light weight, strength, and machinability and to conduct heat away from optical elements and an image forming device of the projection engine. The condenser tube defines the light-path aperture and includes a mounting face on which the hemispherical mounting points are positioned. To provide superior light quality and intensity to the projection engine, the lamp-reflector assembly is positioned relative to the light-path aperture within positional and parallelism tolerances of approximately ±0.002 inch (0.05 mm). However, positional and parallelism errors of up to ±0.020 inch (0.05 mm) will produce satisfactory results in most multimedia image projection applications that use an elliptical reflector. Parabolic and spherical reflectors require less accurate positioning. To attain the desired positioning accuracy, the hemispherical mounting points are precisely machined of hardened steel and fitted within holes that have been reamed in the mounting face of the condenser tube after it is cast. The mounting points are coated with a TEFLON coating to reduce friction and facilitate proper seating of the kinematic mounting features against the mounting points.

The lamp-reflector assembly is supported within the lamp frame so that an outer face of the collar rests against an interior side of a leading wall of the lamp frame. The biasing mechanism preferably comprises three coil springs each connected at one end to the lamp frame proximal to the leading wall and at the other end to a lamp retainer plate that is positioned against a distal end of the endcap of the lamp-reflector assembly. The coil springs pull the lamp-reflector assembly toward the interior side of the leading wall. The lamp module connects to the lamp housing by two screws that fit through holes in the lamp frame and thread into threaded inserts in the lamp housing. The lamp housing and lamp frame are sized so that tightening the screws causes the kinematic mounting features to fully engage with the hemispherical mounting points. Tightening the screws also causes the lamp frame to be drawn toward the condenser tube to create a small gap between the lamp-reflector assembly and the interior side of the leading wall of the lamp frame, consequently causing the biasing mechanism to apply greater force to press the lamp-reflector assembly against the condenser tube. Other biasing mechanisms may also be employed. Non-limiting examples of such alternative biasing mechanisms include a leaf spring placed between a back wall of the lamp frame and the lamp-reflector assembly, and magnets positioned on each of the condenser tube and the lamp-reflector assembly that result in attractive magnetic forces when placed in proximity to each other.

Once the lamp module is connected to the lamp housing, an electrical connector of the lamp module slides to electrically couple the lamp module to a power supply of the image projector and to lock the lamp module in place so that the lamp module cannot be removed without disconnecting it from the power supply. When changing a burnt-out lamp module, the plastic lamp frame prevents a user from touching the potentially hot surfaces of the lamp-reflector assembly.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1:
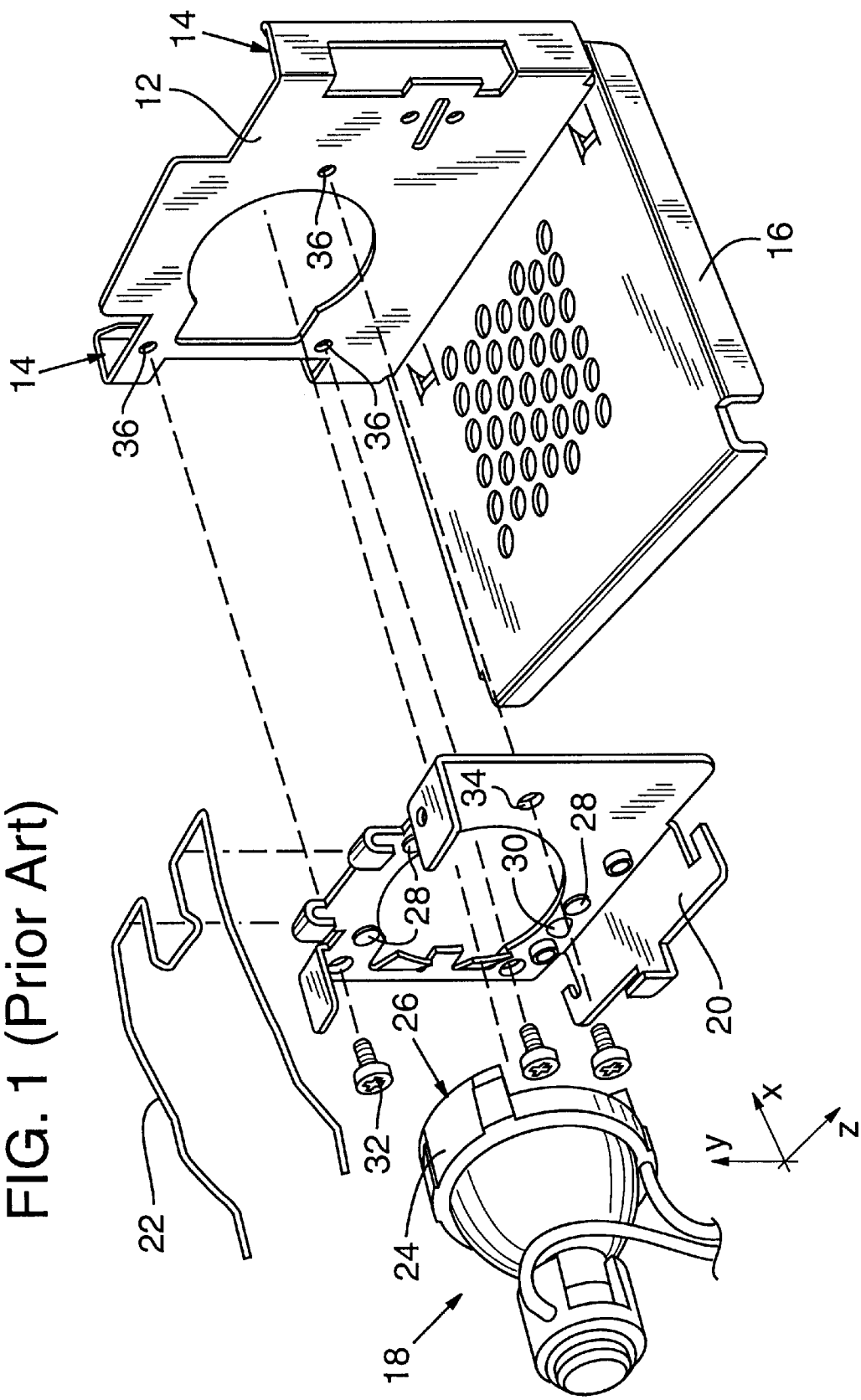
FIG. 1 is an exploded perspective view of a prior art lamp module.
Figure 2:
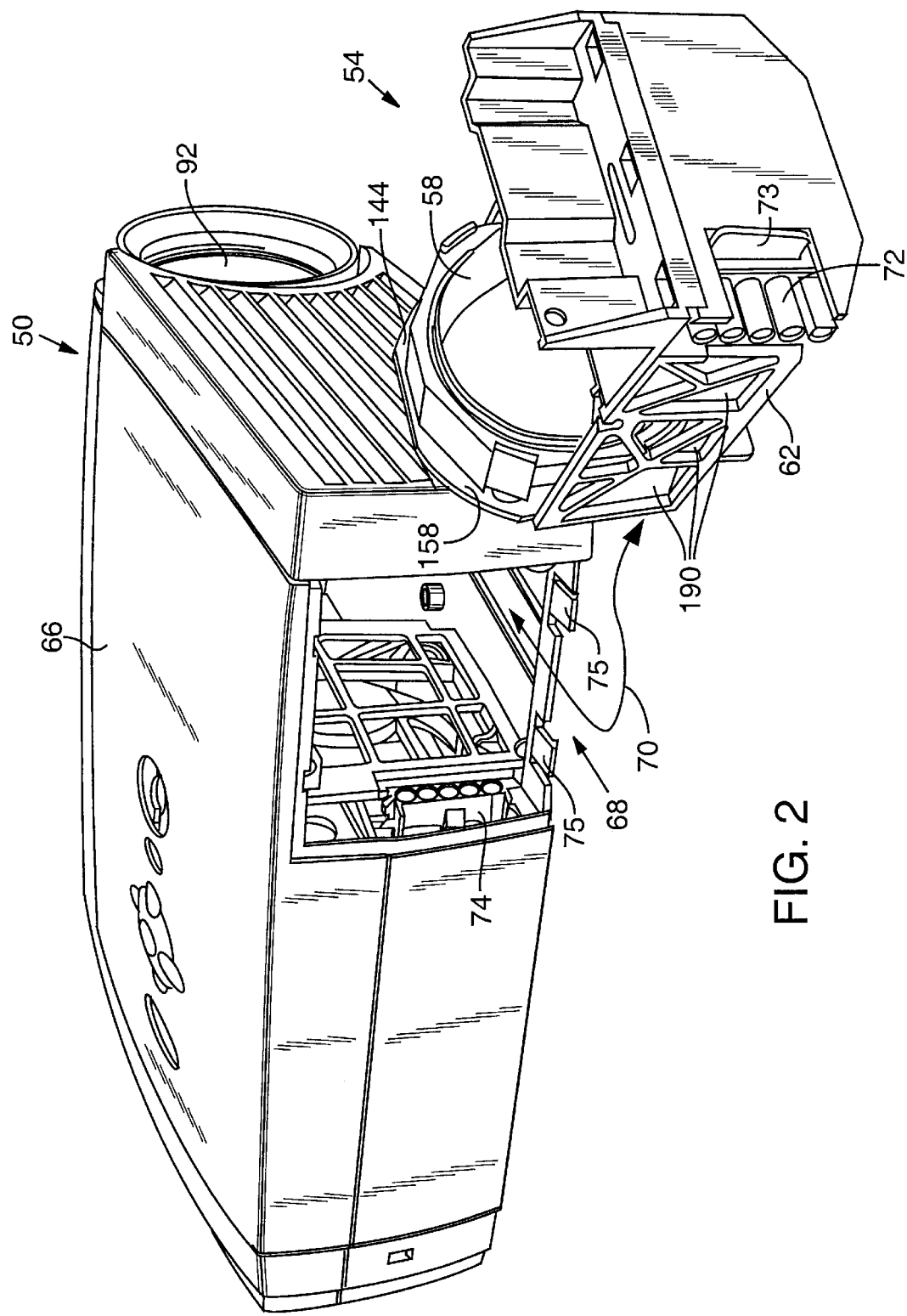
FIG. 2 is a perspective side view of a partly disassembled image projector showing a lamp module in accordance with the present invention with a biasing mechanism of the lamp module omitted.

FIG. 2 shows a pictorial view of a multimedia image projector 50 and a lamp module 54, which represent a first preferred embodiment of the present invention. With reference to FIG. 2, lamp module 54 includes a lamp-reflector assembly 58 supported within a plastic lamp frame 62. Image projector 50 includes an enclosure 66 having an access opening 68 through which lamp module 54 may be slidably inserted and removed along the path generally indicated by an arrow 70. A male electrical connector 72 is slidably mounted to lamp frame 62 and wired to lamp-reflector assembly 58. After a user inserts lamp module 54 fully within enclosure 66, the user pushes a tab 73 to slide male connector 72 into electrical connection with a female electrical connector 74 that is fixedly mounted within enclosure 66. Access opening 68 is then covered by an access panel (not shown) that snaps into place and is secured to enclosure 66 by a pair of latches 75.

Figure 3:
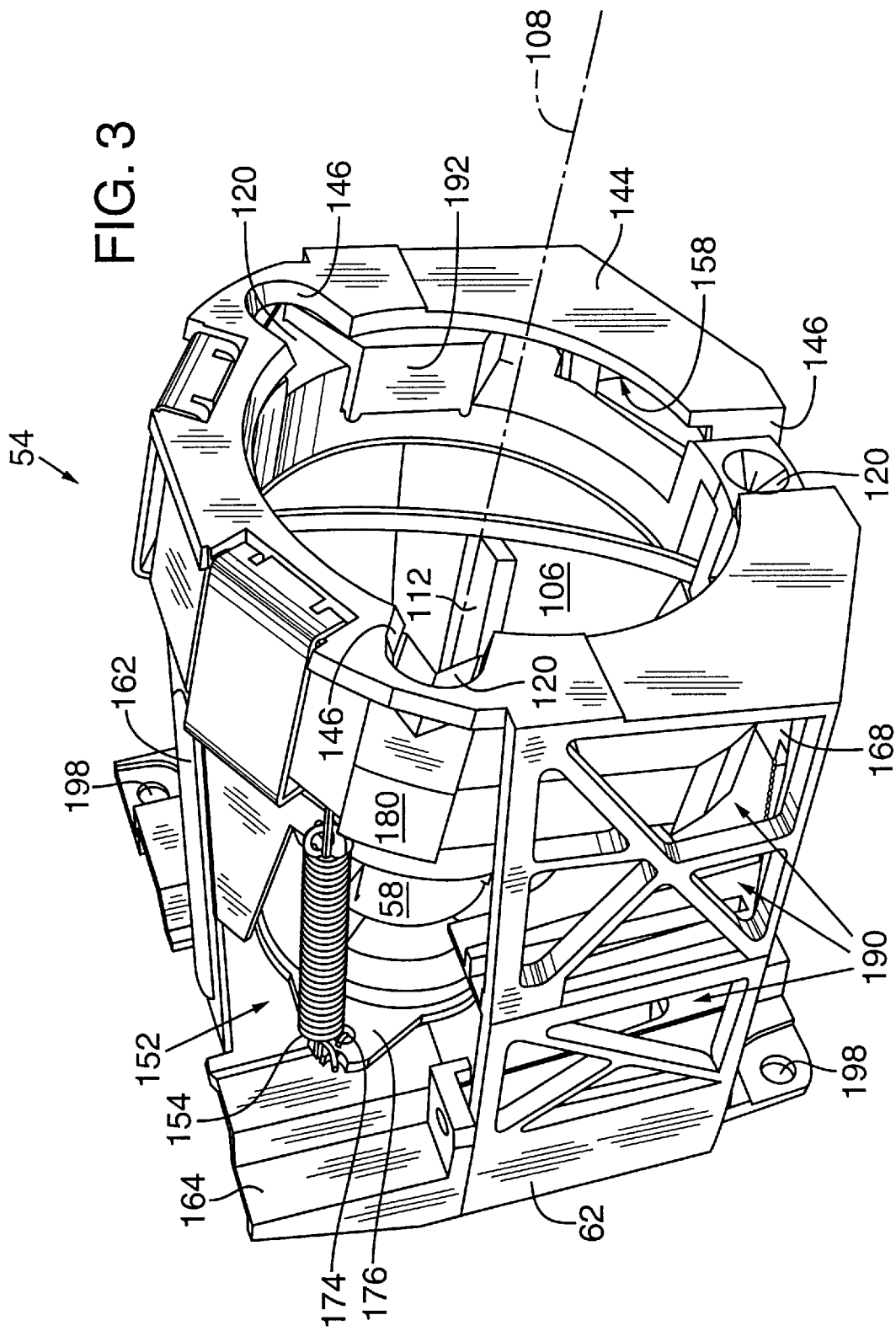
FIG. 3 is an enlarged perspective view of the lamp module of FIG. 2 showing a concave reflecting surface of a lamp-reflector assembly of the lamp module.
Figure 4:
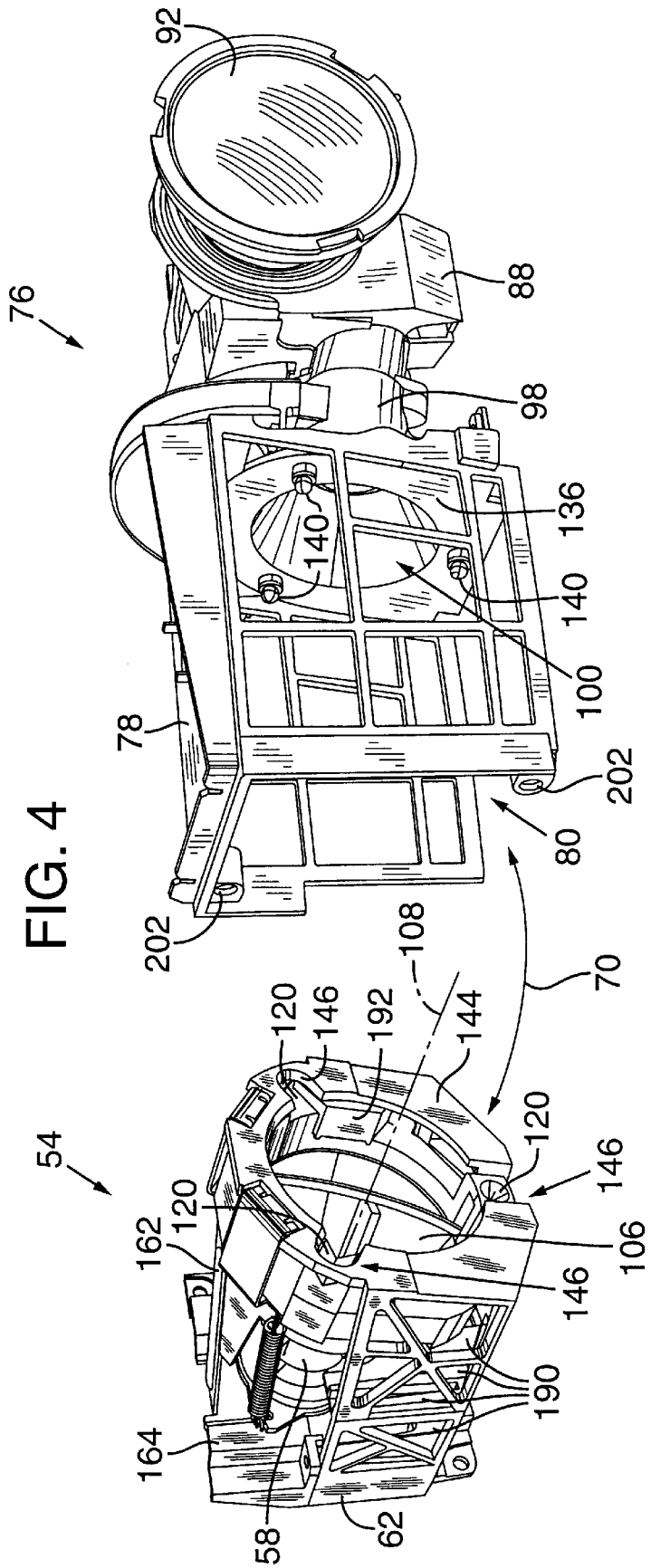
FIG. 4 is a perspective view of a projection engine of the image projector of FIG. 2 and the lamp module of FIG. 2.

FIG. 3 shows an enlarged pictorial view of lamp module 54 rotated to show detail of lamp module 54 not visible in FIG. 2. FIG. 4 shows a pictorial view of lamp module 54 and a projection engine 76 of image projector 50. With reference to FIGS. 3 and 4, projection engine 76 includes a lamp housing 78 defining a cavity 80 into which lamp module 54 may be inserted and removed. Projection engine 76 includes a body 88 that encloses electronic and optical components (not shown) for generating color images in response to an external data signal received by image projector 50 (FIG. 2). Images generated within projection engine 76 are projected through a projection lens 92 mounted on body 88. A condenser tube 98 is securely mounted to body 88 and includes a light-path aperture 100 sized to receive substantially all of the visible light projected from lamp module 54 when it is inserted in its operating position within cavity 80. Body 88 and condenser tube 98 are manufactured of cast magnesium alloy for its light weight, machinability, strength, and heat dissipation. Lamp frame 62 and lamp housing 78 are both injection molded of either RYTON, a polyphenylene sulphide resin sold by Phillips Chemical Company, Houston, Texas, or ULTEM, a polyetherimide resin sold by GE Plastics, Pittsfield, Massachusetts. Both RYTON and ULTEM have high temperature resistance, strength, and dimensional stability.

Figure 5:
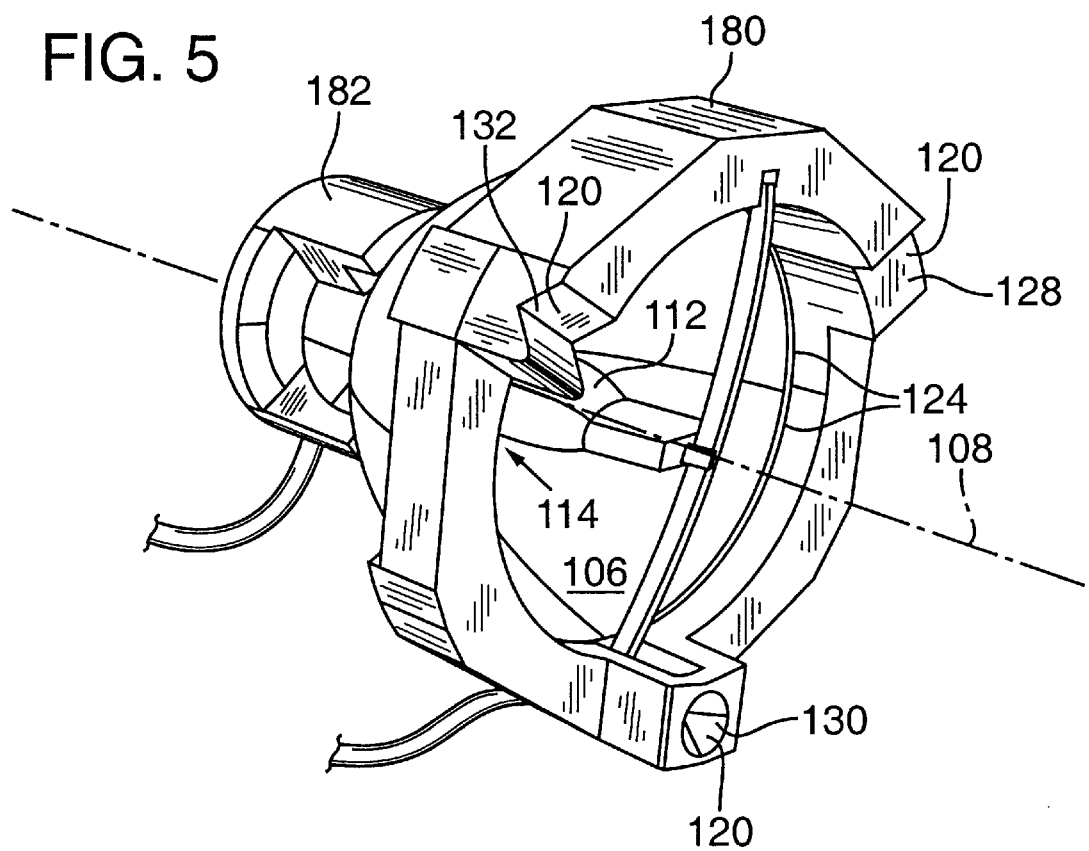
FIG. 5 is a perspective view a lamp-reflector assembly of the lamp module of FIG. 2.

FIG. 5 shows a pictorial view of lamp-reflector assembly 58 removed from lamp frame 62. With reference to FIGS. 3–5, lamp-reflector assembly 58 includes a concave reflector 106 having an axis of symmetry 108, and further includes a light source 112 positioned adjacent reflector 106 along axis of symmetry 108 near a focal point or crown 114 of reflector 106. To provide adequate light intensity and quality, light source 112 is preferably a 270-watt, metal-halide arc lamp, although light sources dissipating less than approximately 300 watts are suitable for use in portable multimedia image projectors. Other light sources such as different types of arc lamps, incandescent lamps, fluorescent lamps, burners, photo diode modules, and lasers are not typically used to achieve the light intensity and light quality required for multimedia image projectors, but are contemplated to be within the scope of the invention. Reflector 106 may be elliptical, parabolic, or spherical in shape, but is preferably elliptical to maximize the brightness of the image projected by projection engine 76. However, with an elliptical reflector 106, the operative alignment of lamp-reflector assembly 58 with the optics and electronics of projection engine 76 is important. This is so because elliptically shaped reflectors reflect light toward a point rather than in a diffuse beam as produced by parabolic and spherical reflectors. Because lamp module 54 has a limited life span, it must be replaceable, making undesirable any post-installation adjustment of the position of lamp-reflector assembly 58 relative to light-path aperture 100.

To obtain sufficient relative positional accuracy and alignment between lamp-reflector assembly 58 and light-path aperture 100, lamp-reflector assembly 58 includes three precisely sized kinematic mounting features 120 accurately spaced around a periphery rim 124 of reflector 106. Kinematic mounting features 120 preferably include a flat 128, a cone 130, and a V-groove 132 equidistantly spaced about periphery rim 124. Condenser tube 98 (FIG. 3) includes a mounting face 136 that supports three hemispherical mounting pins 140 accurately positioned around light-path aperture 100 and sized to complement kinematic mounting features 120. Lamp frame 62 includes a leading wall 144 having reliefs 146 which provide clearance for mounting pins 140 as lamp module 54 is installed in cavity 80 so that kinematic mounting features 120 mate with mounting pins 140. To ensure precise positioning of lamp-reflector assembly 58, mounting pins 140 are precision machined of hardened steel and press fit into holes that are reamed in mounting face 136 after condenser tube 98 has been cast. Mounting pins 140 are coated with TEFLON to reduce friction and facilitate precise seating of kinematic mounting features 120.

Figure 6:
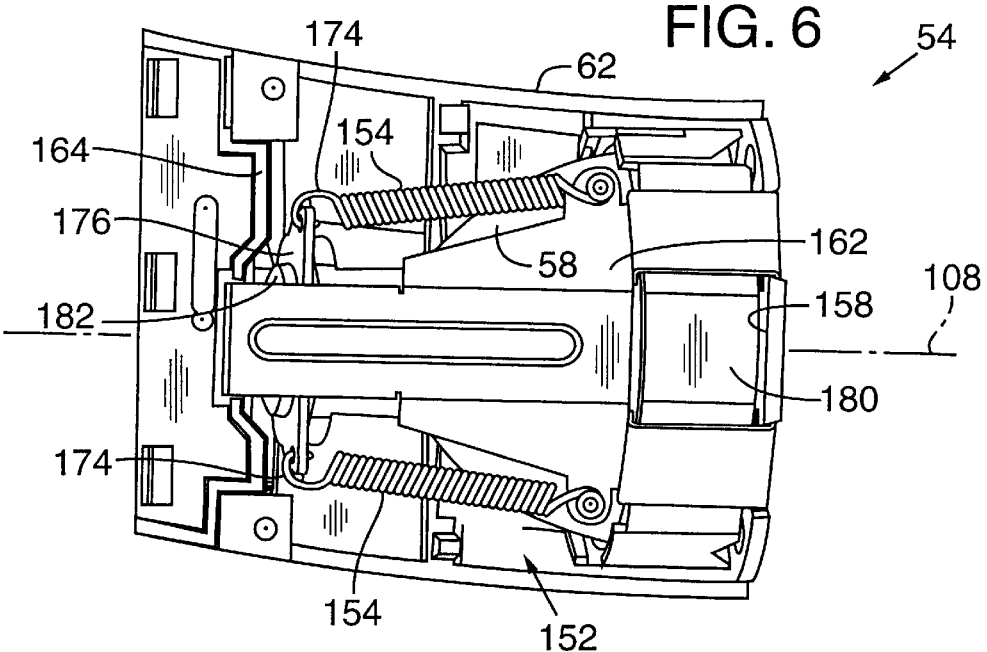
FIG. 6 is a top plan view of the lamp module of FIG. 2.
Figure 7:
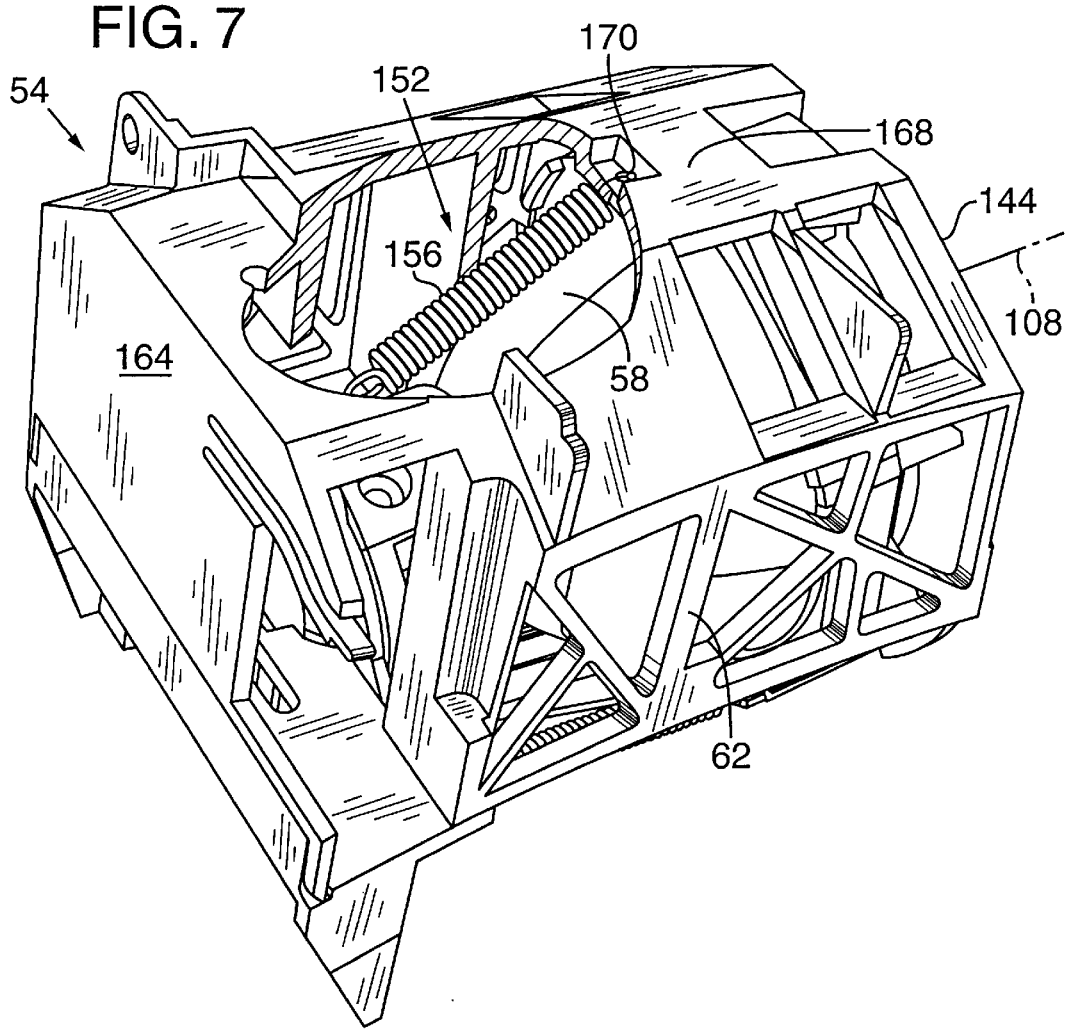
FIG. 7 is a back, side, and bottom perspective view of the lamp module of FIG. 2 with a portion of an underside of lamp module cut away to show detail of the biasing mechanism.

FIGS. 6 and 7 are respective top plan and bottom perspective views of lamp module 54 showing detail of a biasing mechanism 152 of lamp module 54. With reference to FIGS. 6 and 7, biasing mechanism 152 includes two upper coil springs 154 and a lower coil spring 156 that cause lamp-reflector assembly 58 to be forced toward an interior side 158 of leading wall 144. Upper coil springs 154 are positioned on either side of a spacer bracket 162 that spans between leading wall 144 and a back wall 164 of lamp frame 62. Lower coil spring 156 is positioned centrally between lamp-reflector assembly 58 and an undercarriage 168 of lamp frame 62. One end of each of the upper coil springs 154 connects to spacer bracket 162 proximal to leading wall 144, and one end of lower spring 156 connects to an anchor hole 170 formed in undercarriage 168 proximal to leading wall 144. The other ends of upper and lower springs 154, 156 are connected to three anchor points 174 on a lamp retainer plate 176 that is positioned against lamp-reflector assembly 58 opposite kinematic mounting features 120 so as to preload upper and lower springs 154, 156. Anchor points 174 are equidistantly spaced about axis of symmetry 108 and positioned so that coil springs 154 impart a biasing force to lamp-reflector assembly 58 in a direction generally parallel to axis of symmetry 108 when lamp module 54 is installed in cavity 80, as further described below. Lamp retainer plate 176 and spacer bracket 162 are preferably made of aluminum for light weight, heat resistance, and strength. Biasing mechanism 152 retains lamp-reflector assembly 58 within lamp frame 62 while allowing it to float laterally within lamp frame 62 and self-align as kinematic mounting features 120 are mated with mounting pins 140.

Kinematic mounting features 120 are formed in a ceramic collar 180 to reduce the manufacturing cost of lamp-reflector assembly 58. Collar 180 is bonded or "potted" to periphery rim 124 of reflector 106 with ceramic cement compound (not shown). Kinematic mounting features 120 may also be formed directly in reflector 106 thereby eliminating the need for collar 180, but not without significantly increasing the cost of lamp-reflector assembly 58. Lamp-reflector assembly 58 also includes a ceramic endcap 182 to which reflector 106 and light source 112 are accurately bonded using ceramic cement. Collar 180, endcap 182, and the cement used in lamp-reflector assembly 58 are made of ceramic for heat resistance and because the thermal expansion properties of ceramic closely resemble the thermal expansion properties of reflector 106, which is formed of glass. Reflector 106 is coated with an infrared transmissive dichroic coating that transmits heat radiating from light source 112, while reflecting substantially all light in the visible wavelength range. A fan 188 positioned within enclosure 66 (FIGS. 2 and 7) directs a cooling air flow through openings 190 in lamp frame 62 and across lamp-reflector assembly 58. A deflector fin 192 is mounted on collar 180 to direct a portion of the airflow into the concave region of reflector 106 to cool reflector 106 and light source 112.

To ensure that lamp-reflector assembly 58 will cause image projector 50 to generate the desired projected image brightness, reflector 106 is bonded to collar 180 and placed in a test fixture (not shown) before assembling light source 112 and endcap 182. The test fixture includes mounting pins arranged for seating kinematic mounting features 120 and an aperture positioned at the theoretical focal distance from reflector 106. After collar 180 and reflector 106 have been bonded together and positioned in the test fixture, light source 112 is positioned within reflector 106 near its crown 114 so that the light directed through the aperture of the test fixture falls within test limits that correlate to the desired image brightness to be projected by image projector 50. Light source 112 and endcap 182 are then bonded to reflector 106. This assembly method allows light source 112 to be offset from the focal point of reflector 106 to compensate for slight alignment errors between reflector 106 and collar 180. This assembly method also results in improved positioning and brightness of the light directed into projection engine 76 by lamp-reflector assembly 58, without requiring further adjustment of lamp-reflector assembly 58 after it is installed in either lamp frame 62 or image projector 50.

Figure 8A:
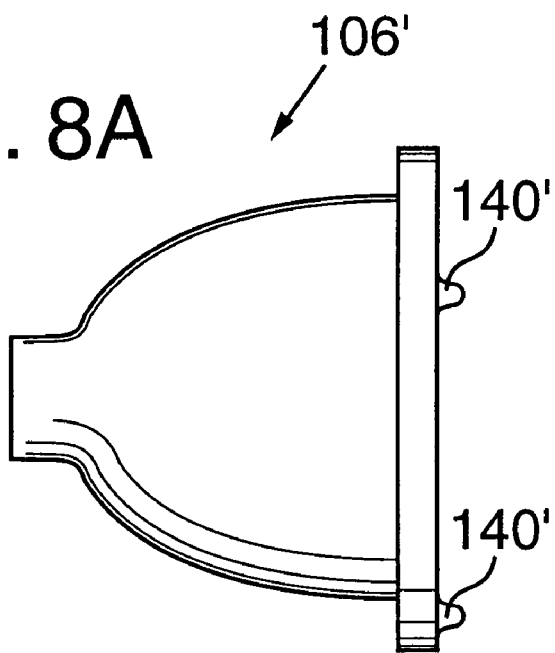
FIGS. 8A and 8B are respective side and front elevation views of an alternative embodiment of a reflector of the lamp-reflector assembly.
Figure 8B:
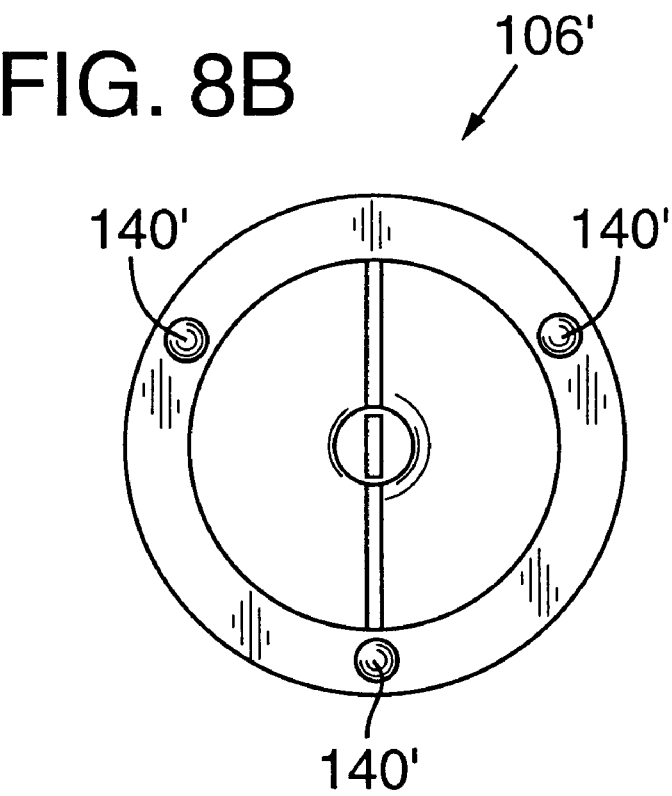

FIGS. 8A and 8B show respective side and front elevation views of an alternate embodiment of a reflector 106' including hemispherical mounting points 140' formed therein. In this embodiment, the kinematic mounting features (not shown) are machined or formed in the mounting face of the condenser tube. In this embodiment, it is possible to eliminate the use of a ceramic collar, because mounting points 140' are easier to form in the glass material of reflector 106' than the flat, cone, and V-groove of the kinematic mount.

Figure 9:
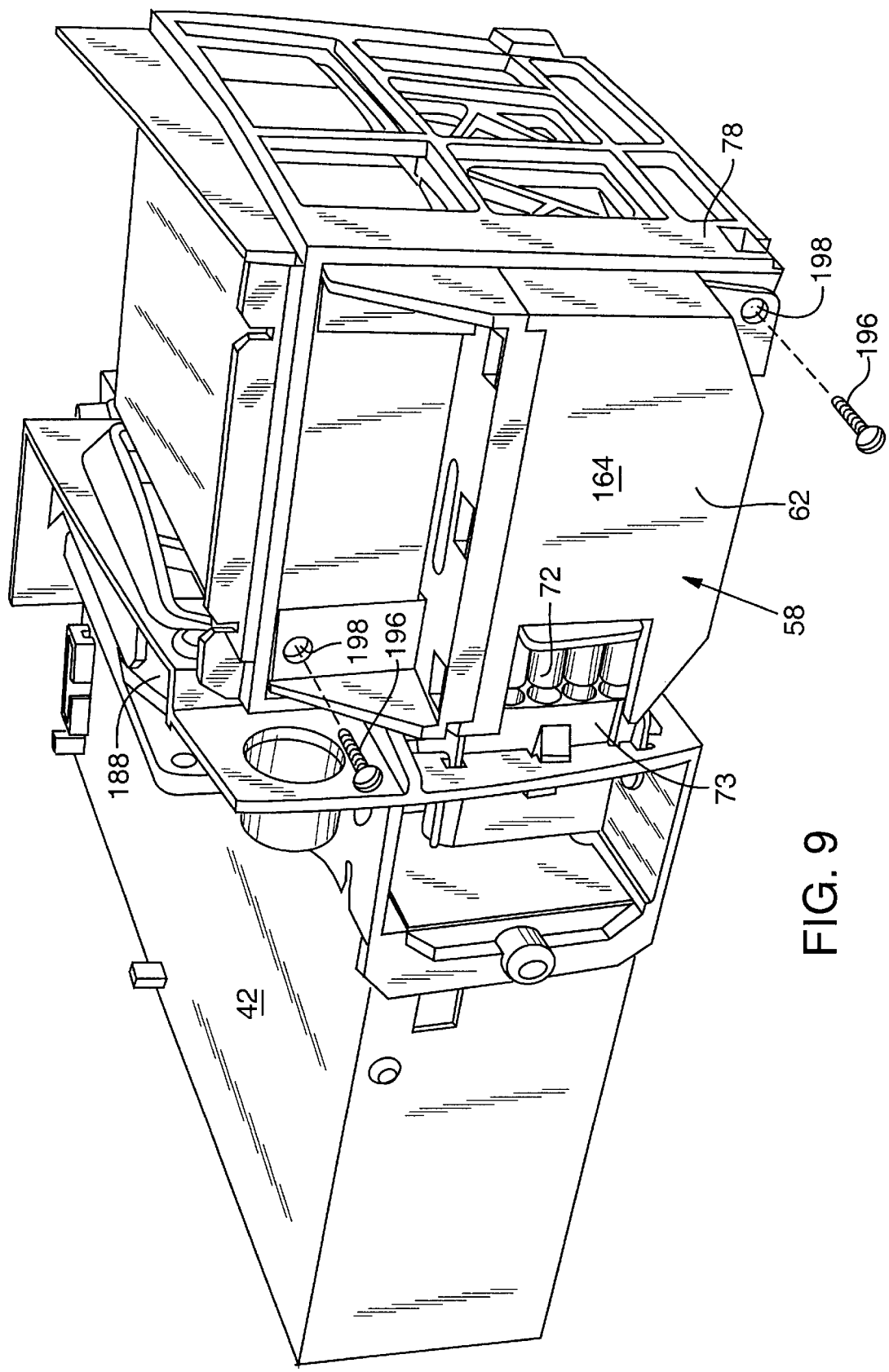
FIG. 9 is a perspective view of internal components of the image projector of FIG. 2 showing the lamp module operatively positioned in a lamp housing and further showing screws in the disassembled position.

FIG. 9 shows a pictorial view of lamp module 58 installed within lamp housing 78. With reference to FIG. 9, a pair of screws 196 are inserted through mounting holes 198 in back wall 170 of lamp module 54 and threaded into threaded inserts 202 (FIG. 4) that have been insert molded or press fit into lamp housing 78. Screws 196 are tightened to cause lamp frame 62 to be drawn toward condenser tube 98 (FIG. 4). Lamp frame 62 and lamp housing 78 are sized so that kinematic mounting features 120 contact mounting points 140 before screws 196 are fully tightened. Fully tightening screws 196 results in a small gap (not shown) between lamp-reflector assembly 58 and interior side 158 of leading wall 144 of lamp frame 62. This gap allows lamp-reflector assembly 58 to float so that kinematic mounting features properly seat against mounting pins 140. It will be obvious to one skilled in the art that other biasing mechanisms can be used with lamp module 54 to bias lamp-reflector assembly 58 toward condenser tube 98. The invention may also be employed without a biasing mechanism through the use of a mounting bracket (not shown) designed to securely connect lamp-reflector assembly 58 to condenser tube 98.

It will be obvious to those having skill in the art that many changes may be made to the details of the above-described embodiments of this invention without departing from the underlying principles thereof. The scope of the present invention should, therefore, be determined only by the following claims.

What is claimed is:

1. A lamp module for use in an image projector having a light-path aperture, the lamp module comprising:

a prefocused lamp-reflector assembly including a concave reflector having a crown and bounded by a periphery rim, a light source fixedly positioned adjacent the crown of the concave reflector, and a collar rigidly mounted to the periphery rim of the concave reflector; and a plurality of kinematic mounting features formed in the collar in a predetermined spatial relationship for seating against corresponding ones of a plurality of complementary hemispherical mounting points located on the image projector around the light-path aperture to precisely orient the lamp-reflector assembly adjacent the light path aperture when the lamp-reflector assembly is urged toward the mounting points.

2. The lamp module of claim 1, further comprising a biasing mechanism, the biasing mechanism urging the lamp-reflector assembly toward the mounting points to seat the kinematic mounting features against the mounting points and thereby precisely orient the lamp-reflector assembly relative to the image projector.

3. The lamp module of claim 2 in which the biasing mechanism comprises a spring for operatively coupling the lamp-reflector assembly to the image projector.

4. The lamp module of claim 3, further comprising a lamp frame supporting the lamp-reflector assembly and mountable to the image projector so that the kinematic mounting features are seated against the mounting points when the lamp frame is mounted to the image projector, the spring operatively coupling the lamp frame to the lamp-reflector assembly to force the kinematic mounting features of the lamp-reflector assembly against the mounting points of the image projector when the lamp frame is mounted to the image projection, the lamp module removable from the image projector for convenient replacement of the lamp module.

5. The lamp module of claim 1 in which the kinematic mounting features, when seated against the mounting points, provide six independent constraints on movement of the lamp-reflector assembly that correspond to three translational and three rotational degrees of freedom.

6. The lamp module of claim 1 in which:

the concave reflector has an axis of symmetry; and the kinematic mounting features include a flat, a V-groove, and a conical depression substantially equidistantly spaced around the periphery rim and oriented in alignment with the axis of symmetry to receive the mounting points in the form of three hemispherical pins.

7. A system for aligning a prefocused lamp-reflector assembly with a light-path aperture of an image projector, the lamp-reflector assembly including a concave reflector bounded by a periphery rim and a light source fixedly positioned adjacent the concave reflector, the system comprising:

a plurality of hemispherical mounting points positioned in a predetermined spatial relationship around one of the light-path aperture of the image projector and the periphery rim of the concave reflector;

a plurality of kinematic mounting features complementary to the plurality of mounting points and rigidly positioned in a predetermined spatial relationship around the other of the light-path aperture of the image projector and the periphery rim of the concave reflector for seating against the mounting points; and a biasing mechanism urging the kinematic mounting features of the lamp-reflector assembly against the mounting points to precisely orient the lamp-reflector assembly and provide six independent constraints on movement of the lamp-reflector assembly relative to the light-path aperture.

8. In an image projector having a light-path aperture, a method of removably mounting a prefocused lamp-reflector assembly of a replaceable lamp module in precise alignment with the light-path aperture, the method requiring no post-mounting adjustment, and the lamp-reflector assembly including a concave reflector bounded by a periphery rim and a light source fixedly positioned adjacent the concave reflector, the method comprising:

providing a plurality of stationary hemispherical mounting points in a predetermined spatial relationship around one of the light-path aperture of the image projector and the periphery rim of the concave reflector;

providing a plurality of kinematic mounting features around the other of the light-path aperture of the image projector and the periphery rim of the concave reflector, the kinematic mounting features complementary to the mounting points;

positioning the lamp-reflector assembly adjacent to the light-path aperture so that the mounting points are seated in the kinematic mounting features; and biasing the lamp-reflector assembly to urge the kinematic mounting features against the mounting points and thereby precisely orient the lamp-reflector assembly and provide six independent constraints on movement of the lamp-reflector assembly relative to the light-path aperture.

9. The method of claim 8, further comprising:

providing a lamp frame; and releasably supporting the lamp-reflector assembly on the lamp frame; and in which:

the positioning of the lamp-reflector assembly includes positioning the lamp frame and the lamp-reflector assembly as a unit adjacent the light path aperture; and biasing of the lamp-reflector assembly includes rigidly mounting the lamp frame to the image projector.

10. A replaceable lamp module for installation in and use with an image projector having a light-path aperture, the lamp module comprising:

a prefocused lamp-reflector assembly including a concave reflector and a light source positioned adjacent the concave reflector;

a lamp frame removably mountable on an image projector adjacent a light-path aperture of the image projector, the lamp frame supporting the lamp-reflector assembly, and the lamp frame and lamp-reflector assembly removably installed as a unit in the image projector for convenient installation and replacement of the lamp module;

a plurality of kinematic mounting features positioned on the lamp-reflector assembly in a predetermined spatial arrangement for seating against corresponding ones of a plurality of complementary mounting points rigidly positioned on the image projector to precisely align the lamp-reflector assembly relative to the light path aperture when the lamp module is installed in the image projector; and a biasing mechanism operatively connected to the lamp-reflector assembly and positioned to urge the kinematic mounting features of the lamp-reflector assembly against the mounting points when the lamp module is installed in the image projector so that the lamp-reflector assembly is self-aligning relative to the light-path aperture.

11. The lamp module of claim 10 in which the biasing mechanism comprises a spring for operatively coupling the lamp-reflector assembly to the image projector.

12. The lamp module of claim 10 in which the kinematic mounting features, when seated against the mounting points, provide six independent constraints on movement of the lamp-reflector assembly that correspond to three translational and three rotational degrees of freedom.

13. The lamp module of claim 10 in which:

the concave reflector has an axis of symmetry; and the kinematic mounting features include a flat, a V-groove, and a conical depression substantially equidistantly spaced about the periphery rim and oriented in alignment with the axis of symmetry to receive the mounting points in the form of three hemispherical pins when the concave reflector is moved along the axis of symmetry toward the hemispherical pins.

14. The lamp module of claim 10 in which the lamp frame is formed of a thermoplastic resin and shaped to generally surround the lamp-reflector assembly to prevent a user from being burned by the lamp-reflector assembly when replacing the lamp module.

15. The lamp module of claim 4 in which the lamp frame is formed of a thermoplastic resin and shaped to generally surround the lamp-reflector assembly to prevent a user from being burned by the lamp-reflector assembly when replacing the lamp module.

* * * * *